Jan. 13, 1931.  J. W. SMITH  1,789,278
SPRING END CONNECTION
Filed June 9, 1928
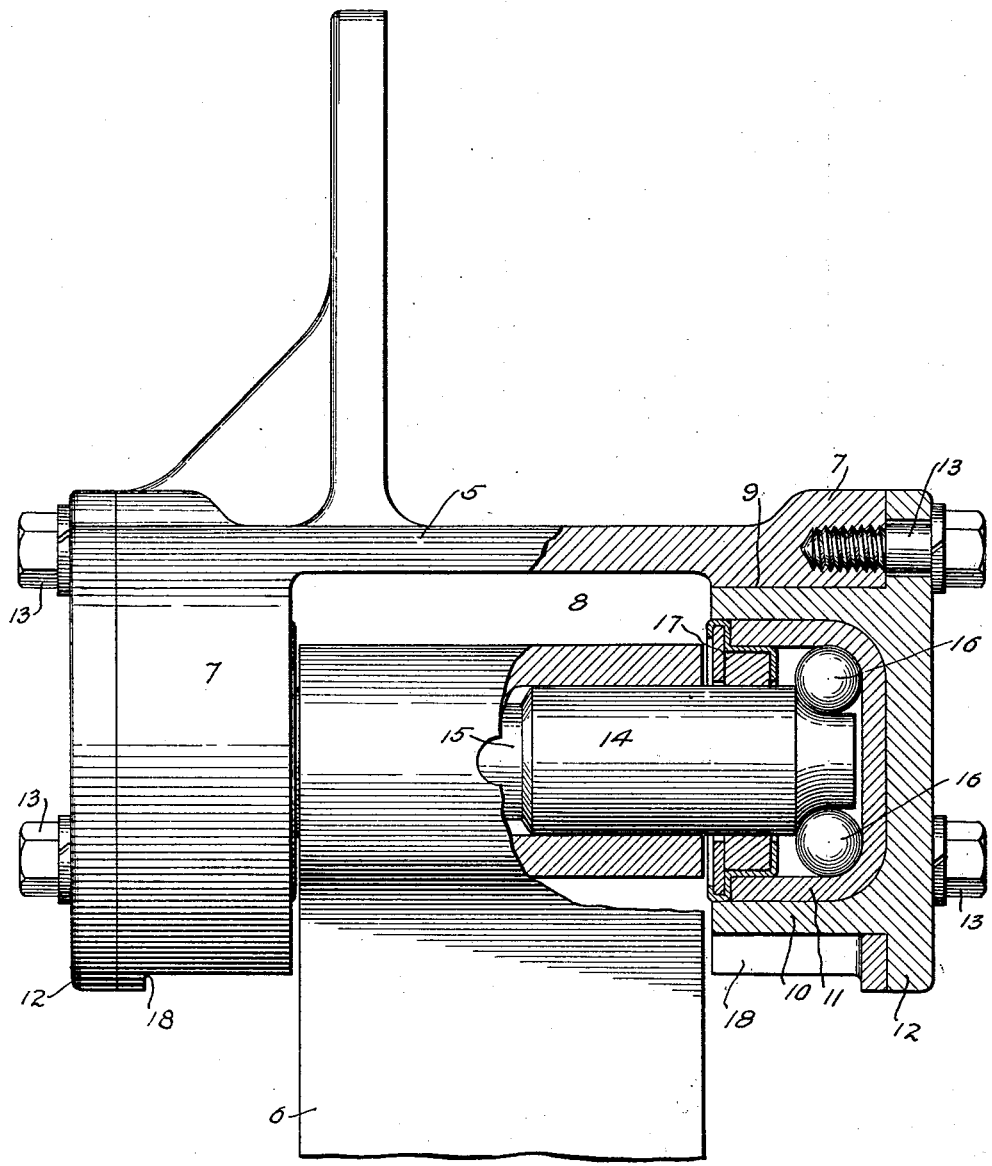
INVENTOR
John W. Smith
BY
Mitchell Burkart
ATTORNEYS.

Patented Jan. 13, 1931

1,789,278

UNITED STATES PATENT OFFICE

JOHN W. SMITH, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING-END CONNECTION

Application filed June 9, 1928. Serial No. 284,191.

My invention relates to a spring end connection for connecting a spring to the frame of a vehicle.

It is an object of the invention to provide a spring end connection which is simple in construction, easy to assemble and which when assembled is automatically adjusted.

In general the object is to provide an improved and simplified form of spring and connection for vehicles.

Briefly stated, in the preferred form of the invention I provide a bracket to be secured to the frame or the spring, but preferably to the frame. The bracket might be made integral with the frame, but I prefer to have the same a separate bracket to be attached. The bracket is provided with spaced apart portions to accommodate races of antifriction bearings. The other member to be connected, for example, the spring is provided with complementary antifriction bearing member raceways and antifriction bearing members such as balls or rollers are seated upon the complementary raceways. The raceways carried by the bracket are positively and definitely limited in their relative positions in one direction so that when the spring end connection is assembled, the bearings will be automatically adjusted, that is to say, the antifriction bearing members such as the balls or rollers will fit their respective races with the desired tightness.

In the drawing which shows, for illustrative purposes only, a preferred form of the invention I have illustrated an end view of a spring and bracket, parts being shown in section to illustrate interior construction.

In said drawings, 5 indicates a bracket which may be attached to a vehicle spring or frame, preferably the latter. 6 indicates a spring to be attached to the frame or the bracket thereon. In the preferred form shown the bracket 5 is provided with spaced apart bosses 7—7 leaving an opening 8 therebetween for the accommodation of the other member to be connected, for example, the spring 6. The bosses are provided with registering bores as 9 for the reception of sleeves or flange portions 10 having antifriction bearing member recesses therein. If desired the antifriction bearing member raceways may be formed in separate raceway cups 11 held in the recesses. The sleeve extensions 10 preferably have external flanges 12—12 which abut the outside end surfaces of the bosses 7—7 as will be clear from the drawings. Suitable means such as the cap-screws 13—13 serve to secure the flanges individually to the bosses 7—7 and definitely and rigidly space the antifriction bearing member raceway portions on the sleeves 10—10 at definite distances apart. The purpose of this definite spacing will be explained more in detail hereafter.

The other member to be connected, for example, the spring 6 is provided with complementary antifriction bearing member raceways and in the form shown I employ a bearing pin 14 which may be secured in a spring eye by any suitable means such as a drive fit or by means of a set-screw or the like extending into the necked portion 15 on the pin. In the particular form illustrated the pin 14 has antifriction bearing member raceways formed directly thereon as indicated in the drawings. Antifriction bearing members such as balls 16—16 are interposed between the raceways carried by the spring and bracket. A suitable form of dust ring 17 serves to exclude dust from and retain lubricant on the antifriction bearing members.

The bosses 7—7 are preferably recessed as indicated at 18—18 so as to permit the passage of the ends of the pin 14 into the position shown before the sleeves 10—10 are inserted.

The assembly and disassembly of the spring end connection are simple operations. To assemble, the pin 14 is moved up substantially to the position illustrated, the recesses 18 serving to permit this movement. The sleeve members 10 and the bearing cups 11 when such are employed together with the anrtifriction bearing members 16 and dust rings 17 are then set in place by inserting the same end wise into the bores of the bosses 7—7. The securing means such as the cap-screws 13—13 are drawn up so as to cause the flanges 12—12 to abut the finished surfaces on the bosses 7—7. When the flanges 12—12 are abutting the bosses the parts should have been so proportioned that the antifriction bearing members are seated with the desired fit.

It will be seen that by ordinary production methods the distance between the bearing raceways at opposite ends of the pin 14 may be definitely determined. The space between the outside surfaces of the bosses 7—7 may likewise be definitely determined, and consequently the distance between the bearing raceways carried by the sleeves 10—10 may be definitely determined. Therefore, when the parts are assembled and the cap-screws drawn up the parts will fit with the desired degree of accuracy. It will be seen that the parts of my improved spring end connection are interchangeable and that in assembling no adjustment is necessary, and the fit of the antifriction bearing members is not dependent upon the skill and judgment of the mechanic who assembles the spring end connection. The parts of my improved spring end connection are few in number and are easily and cheaply manufactured.

While the invention has been described in considerable detail I do not wish to be strictly limited to the form shown since changes may be made within the scope of the invention as defined in the appended claim.

I claim:

In a spring end connection, a bracket having spaced apart bosses with aligned bores therein, pin means to be secured to a spring and extend beyond the sides thereof, said extending parts of said pin means having bearing raceways formed directly thereon, said raceways being a single definite distance apart, end caps for said bosses, means for securing said end caps to said bosses independently of each other, said end caps having parts abutting and being spaced a single definite distance apart by parts of said bosses, said end caps each comprising an outer securing portion and an inwardly directed flange portion extending in said bore, said flange portion defining a bearing cup housing, a bearing cup in said housing, anti-friction bearing members interposed between said bearing cup and said raceway, a lubricant retaining and dust excluding ring surrounding said pin means inwardly of the ends thereof for sealing said anti-friction bearings, said ring being bodily removable with said end cap and bearing cup, each said end cap together with its bearing cup and dust ring being bodily and readily removable as a unit from said boss immediately upon release of said means for securing said end cap to said boss and independently of said raceways on said pin means.

JOHN W. SMITH.